(No Model.)

J. SCOTLAND & F. CORDON.
MARINER'S COMPASS.

No. 310,729.  Patented Jan. 13, 1885.

Witnesses
S. N. Piper
R. L. Clinton

Inventors
James Scotland
Francois Cordon
by R. H. Eddy atty.

United States Patent Office.

JAMES SCOTLAND AND FRANÇOIS CORDON, OF ST. PIERRE, NEAR THE ISLANDS OF MIQUELON, FRANCE.

MARINER'S COMPASS.

SPECIFICATION forming part of Letters Patent No. 310,729, dated January 13, 1885.

Application filed July 15, 1884. (No model.)

*To all whom it may concern:*

Be it known that we, JAMES SCOTLAND, a subject of the Queen of Great Britain, and FRANÇOIS CORDON, a citizen of the Republic of France, both residing in St. Pierre, near the Islands of Miquelon, a Colony of France, have invented a new and useful Improvement in Mariners' Compasses; and we do hereby declare the same to be described in the following specification and represented in the accompanying drawings, of which—

Figure 1:
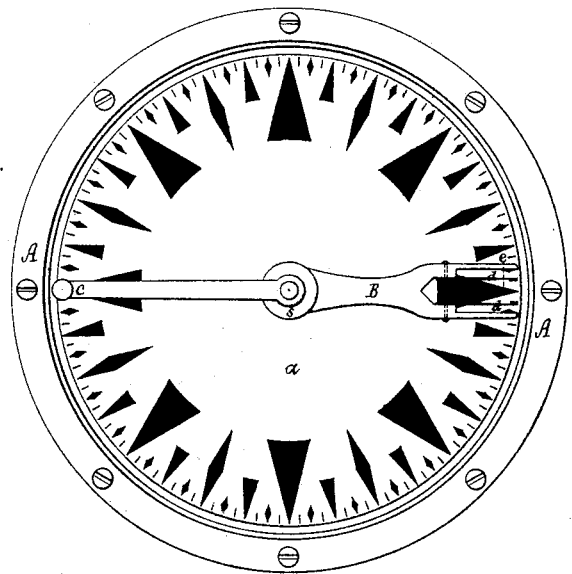
Figure 2:
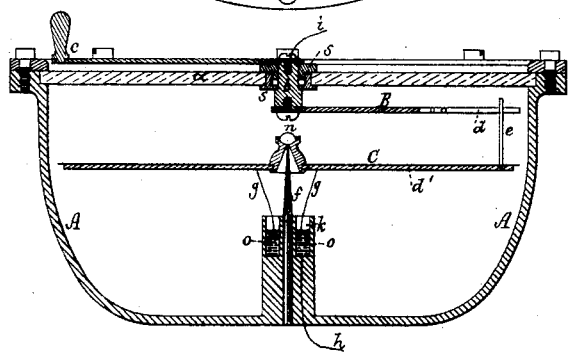
Figure 3:
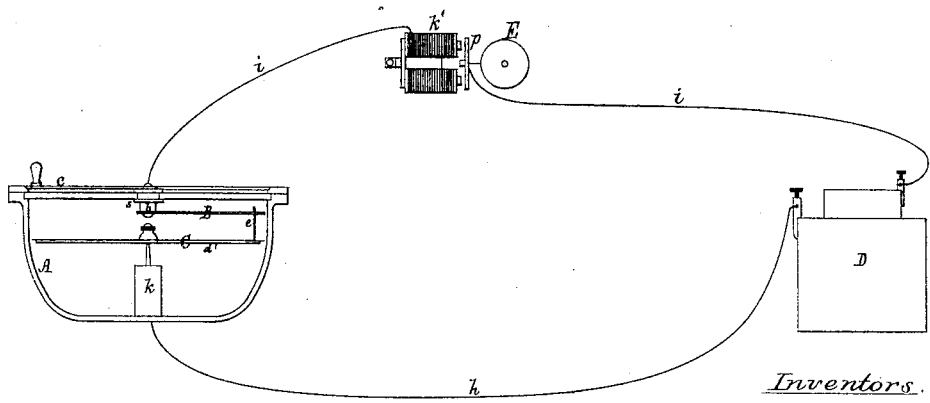

Figure 1 is a top view, and Fig. 2 a transverse section, of a mariner's compass provided with our invention, the nature of which is defined in the claims hereinafter presented. Fig. 3 is a diagram exhibiting the said compass as applied to an electro-magnetic circuit and battery provided with an alarm apparatus.

The invention is to enable the captain or officer of a navigable vessel to be immediately warned or notified of an inadvertent, accidental, or willful change of the course of said vessel, or that the helmsman may not be properly attentive to steer the vessel on the course in which he may have been ordered to keep her.

In carrying out our invention we provide the compass-bowl A with a metallic arm, B, arranged within it below its glass cover $a$, and pivoted to the latter at its central part, so as to be revoluble around in a circle concentric with the bowl, the pivot $b$ of such arm being of metal and extended up through the glass cover, or a bearing, $s$, thereon, and provided with some device for revolving it (the said arm) by hand. The said device may be a knob or milled head or a crank, $c$. The said arm B we fork or furnish with two metallic prongs or springs, $d\ d$, extending from it, as represented, and we project upward from the magnetic needle or the magnet $d'$ of the compass-card C a metallic pin or standard, $e$, which we extend directly between the two prongs or springs $d\ d$.

As the central bearing of the pivot $f$ of the needle or compass card is usually of agate or some suitable substance which is a non-conductor of electricity, we, when such bearing is of such character, have extended down from the magnetic needle one or two wires, $g\ g$, to enter a charge, $o$, of mercury, arranged in an annular groove or cup, $k$, through and from which the pivot $f$ extends, as shown. We prefer to have two of the wires, $g$, rather than one only, for with two of them of like weight one will counterbalance the other, and thus not affect the equilibrium of the needle or card.

In electrical connection with the mercury in the cup we put one of the wires of an electro-magnetic circuit, and the other in electrical connection with the pivot of the revoluble arm B. These wires are shown at $h$ and $i$, one of them being extended to one and the other to the other pole of a galvanic battery, D, (or, instead of a battery, some other proper means of generating electricity,) and also about an electro-magnet, $k'$, whose armature $p'$ is applied to the trigger of a suitable alarm, E.

By turning the arm B around to the desired course for the vessel to be steered upon, the stud $e$ will be midway between the two prongs or springs $d\ d$ of the arm B, and so long as the vessel may remain on such course the electric circuit will be open; but on any undue variation of direction of steering taking place the stud will be carried into contact with one of the said springs $d\ d$, and in consequence thereof the circuit will be closed, the armature drawn to the magnet, and the alarm apparatus will be put in action, and notice thereby will be given of the defective steering or change of course of the vessel.

When the bearing of the needle or compass-card is wholly metallic, the wire $h$ may be electrically connected with the pivot; but when such bearing is a piece, $n$, of agate, or material that is a non-conductor of electricity, we use one or both the wires, $g$, and the cup of mercury, as set forth.

We claim—

1. The combination of a mariner's-compass bowl and its needle or card with a stud extending up from such needle or card, and with a single rigid revoluble furcated arm provided with springs within the fork, and pivoted to the glass cover of the bowl of the compass, and having such stud between its prongs, the said revoluble arm and the pivot of the needle or card having or being to have connected with them an electric circuit provided with a galvanic battery or generator of electricity, and an apparatus for sounding or giving an alarm when the circuit may be closed by the stud being carried into contact with the revoluble arm of one of the prongs or springs thereof, all being to operate substantially and for the purpose as set forth.

2. The combination of a mariner's-compass bowl and its needle or card with a single rigid revoluble furcated arm arranged within the bowl and pivoted to its glass cover, a stud extending up from the compass-card or needle and between the prongs of the arm, a cup of mercury, and a wire or wires extending into the latter from the magnetic needle or card, all being substantially and to operate for the purpose described, with an electrical circuit, its galvanic battery, and an alarm applied to such circuit.

3. The combination of a mariner's compass having a single rigid revoluble furcated and metallic arm pivoted to its bowl, and also having a metallic stud extending up from the needle or magnet of the card and between the prongs of such arm, with an electric circuit and its battery or generator of electricity, and with an alarm apparatus connected with such circuit, to operate to sound or give an alarm on the circuit being closed by contact of the stud with the arm, all being substantially and for the purpose as set forth.

JAMES SCOTLAND.
FRANÇOIS CORDON.

Witnesses:
R. O. SHEEHAN,
JOSEPH BURNETT.